(12) United States Patent
Hughes et al.

(10) Patent No.: US 7,685,862 B1
(45) Date of Patent: Mar. 30, 2010

(54) TARGET SYSTEM GIVING ACCURACY AND ENERGY

(75) Inventors: Derke R. Hughes, Warwick, RI (US); Dennis F. Deshamais, Tiverton, RI (US); Jeffrey T. Feaster, Wakefield, RI (US); Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 798 days.

(21) Appl. No.: 11/116,169

(22) Filed: Apr. 25, 2005

(51) Int. Cl.
*G01M 7/00* (2006.01)
*G01H 1/00* (2006.01)
*G01S 3/80* (2006.01)
*F41J 5/06* (2006.01)

(52) U.S. Cl. .................. 73/12.11; 73/584; 367/127; 273/372

(58) Field of Classification Search ............. 73/12.11, 73/584, 862.59, 862.61, 862.627–862.628; 273/372; 367/127
See application file for complete search history.

(56) References Cited

U.S. PATENT DOCUMENTS

| | | | |
|---|---|---|---|
| 3,678,495 A | 7/1972 | Gilbert | |
| 4,261,579 A | 4/1981 | Bowyer et al. | |
| 4,305,142 A | 12/1981 | Springer | |
| 4,745,565 A * | 5/1988 | Garwin et al. | 702/95 |
| 4,885,725 A | 12/1989 | McCarthy et al. | |
| 5,241,308 A * | 8/1993 | Young | 341/34 |
| 5,447,315 A | 9/1995 | Perkins | |
| 5,778,725 A | 7/1998 | Kirschner et al. | |
| 5,943,043 A * | 8/1999 | Furuhata et al. | 345/173 |
| 6,367,800 B1 * | 4/2002 | Sheck et al. | 273/372 |
| 6,826,982 B2 * | 12/2004 | O'Brien et al. | 73/587 |
| 2003/0217873 A1 * | 11/2003 | Paradiso et al. | 178/18.04 |
| 2005/0187036 A1 * | 8/2005 | Ziola et al. | 473/372 |

OTHER PUBLICATIONS

Chang et al., "On-line Impact Identification of Composite Structures Using Built-In Piezoelectrics." Defense Technical Information Center. 1997 <http://stinet.dtic.mil/oai/oai?verb=getRecord&metadataPrefix=html&identifier=ADA329708>.*
Sirohi et al. "Fundamental understanding of piezoelectric strain sensors". Proc. SPIE, vol. 3668, 528-542 (1999). Published online May 29, 2003. Accessed Jan. 13, 2009.*

* cited by examiner

*Primary Examiner*—Lisa M Caputo
*Assistant Examiner*—Jonathan Dunlap
(74) *Attorney, Agent, or Firm*—James M. Kasischke; Michael P. Stanley; Jean-Paul A. Nasser

(57) ABSTRACT

A target for a test range includes an impact plate having at least three strain sensors positioned on the plate. The sensors are connected to a data acquisition board for receiving a signal from each sensor upon impact of a projectile on the plate. The data acquisition board is joined to a processor for calculating impact location and energy. Optionally multiple sensors can be provided having different orientations for accounting for different strain components in the plate.

13 Claims, 1 Drawing Sheet

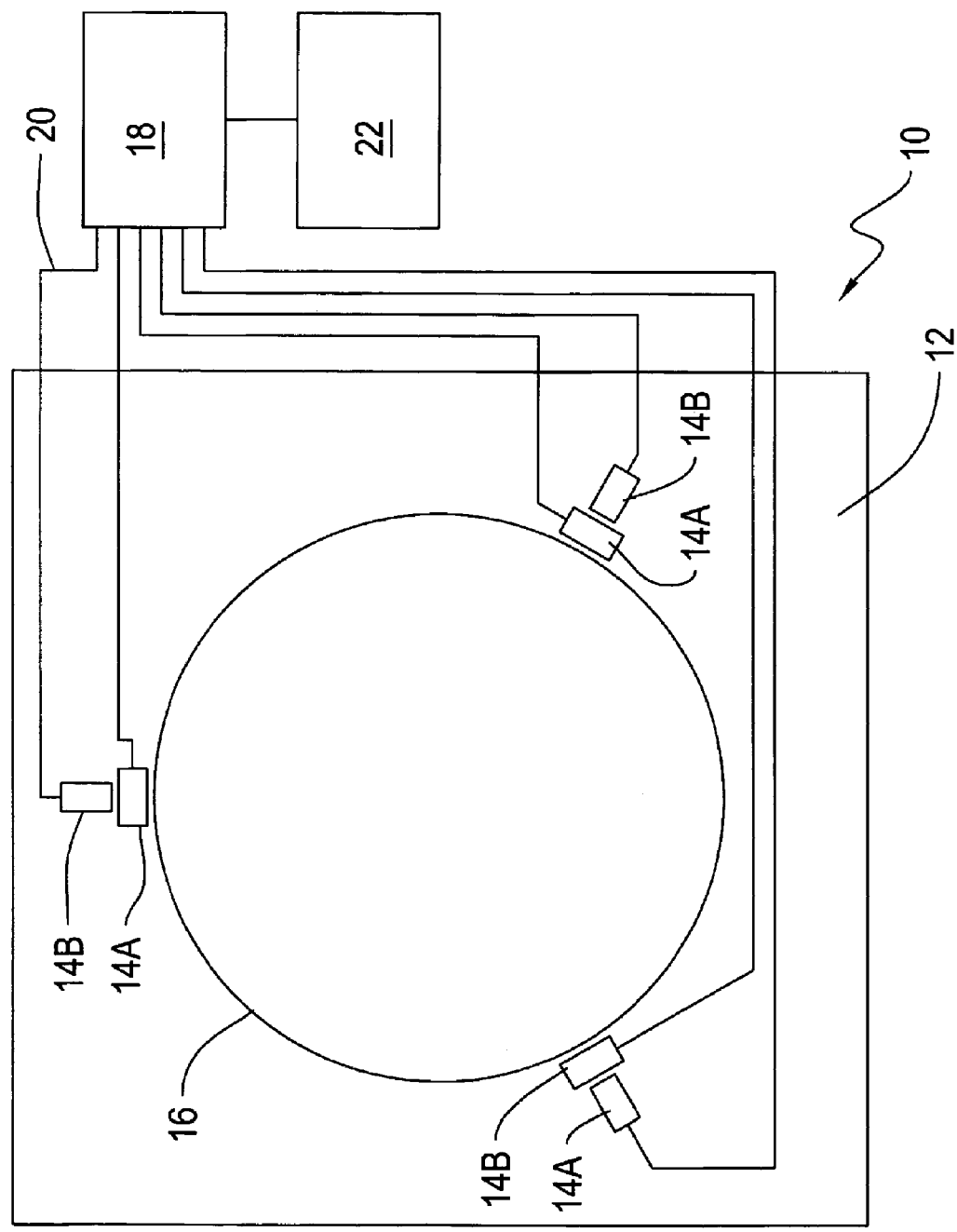

TARGET SYSTEM GIVING ACCURACY AND ENERGY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The invention relates to a target that locates and quantifies the impact of a projectile on a target. This invention more particularly relates to a range and target system for supercavitating underwater projectiles.

(2) Description of the Prior Art

Until recently, it has not been feasible to shoot bullets underwater. Currently, however, supercavitation drag reduction allows bullets to be fired underwater at velocities sufficiently high to inflict damage on a target.

U.S. Pat. No. 5,778,725 discloses a prior art range for testing these underwater supercavitating munitions. The prior art system includes a gun mount aiming the gun along a nominal trajectory. Baffle plates, each having an aperture therethrough, are mounted along the nominal trajectory of the range. Witness screens and motion detectors are used to note passage of the projectile. A bullet receptacle is aligned to receive the projectile. The components are placed in the body of liquid in alignment with each other such that the projectile fired from the gun passes through the apertures in the baffle plates, through the witness screens, through the sensors, and into the receptacle. The sensors measure the projectile's position as a discrete function of time. The witness screens provide an indication as to the projectile's trajectory and energy level. The receptacle retains the projectile for retrieval and examination. This system requires the presence of sensors along the nominal trajectory of the projectile. Witness screens require replacement after each projectile is fired.

In view of the prior art, it is now deemed desirable to have a target for such test range wherein impact energy and accuracy can be measured. Existing ranges utilized in testing atmospheric projectiles do not provide an estimate of impact energy. Because underwater projectiles transit a high drag environment, impact energy is of primary importance in assessing the ability of the projectile to destroy a target. Accuracy and reliability are determined by measuring the impact location.

SUMMARY OF THE INVENTION

It is, therefore, an object of the invention to provide a target for a test range that includes an impact plate having at least three strain sensors positioned on the plate. The strain sensors are preferably piezoelectric sensors. The sensors are connected to a data acquisition board for receiving a signal from each sensor upon impact of a projectile on the plate. The data acquisition board is joined to a processor for calculating impact location and energy. Optionally multiple sensors can be provided having different orientations for accounting for different strain components in the plate.

With the above and other objects in view, as will hereinafter appear, a feature of the present invention is the provision of a target that can calculate both impact energy and accuracy upon impact of a projectile.

The above and other features of the invention, including various novel details of construction and combinations of parts, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent.

The FIGURE shows a target of the current invention.

DESCRIPTION OF THE PREFERRED EMBODIMENTS

A target 10 of the current invention is shown in FIGURE Target 10 is a plate 12 having sensors 14A and 14B positioned thereon. Plate 12 is preferably a steel plate having sufficient thickness to absorb the energy of a projectile of interest. The dimensions of plate 12 are calculated to account for the expected accuracy of the projectile. Sensors 14A and 14B are positioned about a region of expected impact 16 on plate 12. Perpendicular sensors 14A are positioned to measure the strain created from the impact perpendicular to the wave front. Parallel sensors 14B are positioned to measure the strain created parallel to the impact wave front. Perpendicular sensors 14A produce higher amplitudes for low frequency signals, and the parallel sensors 14B will produce higher amplitudes for the high frequency component of the signals. The sensor orientation shown having both kinds of sensors provides the best results by retaining high and low frequency content. Sensors 14A and 143 are preferably lead-zirconium-titanate (PZT) strain sensors; however, other electrical strain sensors could be used.

A multichannel data acquisition board 18 is joined to sensors 14A and 14B by cables 20. Data acquisition board 18 includes a plurality of Analog to Digital converters for converting received analog signals into digital signals which can be analyzed by a processor 22. Board 18 can be a data acquisition board such as the National Instruments 6115 data acquisition board or the like. Multiple boards can be receive all channels of data. Processor 22 can be a well known industry standard processor having sufficient speed to capture the data. The data received by the data acquisition board gives the arrival time information for the hyperbolic tracking algorithm discussed hereinafter. The hyperbolic tracking algorithm determines the impact location of the projectile.

$$(X-x_1)^2+(Y-y_1)_2=C^*(t-t_1)^2 \tag{1}$$

$$(X-x_2)^2+(Y-y_2)_2=C^*(t-t_2)^2 \tag{2}$$

$$(X-x_3)^2+(Y-y_3)_2=C^*(t-t_3)^2 \tag{3}$$

where:

$(x_1,y_1)$, $(x_2,y_2)$, and $(x_3,y_3)$ are the locations of the sensors;

C is the wave speed of steel (5,050 m/s);

X and Y are impact locations;

t is the time of impact; and $t_1$, $t_2$, and $t_3$ are the times the impact is detected at the respective sensor.

Equations (1), (2) and (3) are solved for X and Y by the substitution method until convergence within a predetermined tolerance value. Other solutions methods can be used within the scope of this invention.

Impact energy is calculated by experimentally determining a sensor output amplitude/energy transfer function. The processor 22 can apply the transfer function to give the impact energy. The calculated impact energy and location can be provided to the user by a display or saved in a file.

There is thus provided a smart target for an underwater gun test range. The target has sensors and instrumentation that allow the calculation of impact energy and accuracy. The target is especially adapted to an underwater test range for use with supercavitating projectiles.

It is to be understood that the present invention is by no means limited to the particular construction herein disclosed and/or shown in the drawings, but also comprises any modifications or equivalents within the scope of the claims.

What is claimed is:

1. A target for a range comprising:
    an impact plate for a projectile capable of absorbing the impact energy of the projectile without destruction having a region of expected impact thereon;
    a first three sensors capable of substantially unidirectional strain measurement positioned on said impact plate and oriented with respect to the region of expected impact to measure strain created substantially parallel to an impact induced shock wave front;
    a second three sensors capable of substantially unidirectional strain measurement positioned on said impact plate and oriented with respect to the region of expected impact to measure strain created substantially perpendicular to an impact induced shock wave front;
    means for determining impact location joined to said first three sensors and said second three sensors; and
    means for determining impact energy joined to said first three sensors and said second three sensors.

2. The device of claim 1 wherein said means for determining target impact and said means for determining impact energy comprises:
    a data acquisition board having a plurality of channels with one channel joined to each sensor, said data acquisition board receiving a signal from each sensor and providing data related to said signal; and
    a processor joined to said data acquisition board for receiving data, said processor being capable of calculating impact location and impact energy, said processor being capable of calculating impact energy from an experimentally derived sensor output amplitude to impact energy transfer function programmed in said processor.

3. The device of claim 2 wherein said sensors are strain sensors.

4. The device of claim 3 wherein said strain sensors are made from a piezoelectric material.

5. The device of claim 4 wherein said strain sensors are made from lead-zirconium-titanate.

6. The device of claim 1 further comprising data recording means joined to said means for determining impact location and said means for determining impact energy.

7. A target for a range comprising:
    an impact plate for a projectile capable of absorbing the impact energy of the projectile without destruction having a region of expected impact thereon;
    a first three sensors positioned on said impact plate outside the region of expected impact and oriented with respect to the region of expected impact to measure strain created substantially parallel to an impact induced shock wave front;
    a second three sensors positioned on said impact plate outside the region of expected impact and oriented with respect to the region of expected impact to measure strain created substantially perpendicular to an impact induced shock wave front;
    means for determining impact location joined to said first three sensors and said second three sensors; and
    means for determining impact energy joined to said first three sensors and said second three sensors.

8. The device of claim 7 wherein:
    said first three sensors are capable of substantially unidirectional strain measurement; and
    said second three sensors are capable of substantially unidirectional strain measurement.

9. The device of claim 7 wherein said means for determining target impact and said means for determining impact energy comprises:
    a data acquisition board having a plurality of channels with one channel joined to each sensor, said data acquisition board receiving a signal from each sensor and providing data related to said signal; and
    a processor joined to said data acquisition board for receiving data, said processor being capable of calculating impact location and impact energy, said processor being capable of calculating impact energy from an experimentally derived sensor output amplitude to impact energy transfer function programmed in said processor.

10. The device of claim 7 wherein said sensors are strain sensors.

11. The device of claim 10 wherein said strain sensors are made from a piezoelectric material.

12. The device of claim 11 wherein said strain sensors are made from lead-zirconium-titanate.

13. The device of claim 7 further comprising data recording means joined to said means for determining impact location and said means for determining impact energy.

* * * * *

UNITED STATES PATENT AND TRADEMARK OFFICE
CERTIFICATE OF CORRECTION

| | |
|---|---|
| PATENT NO. | : 7,685,862 B1 |
| APPLICATION NO. | : 11/116169 |
| DATED | : March 30, 2010 |
| INVENTOR(S) | : Derke R. Hughes et al. |

Page 1 of 1

It is certified that error appears in the above-identified patent and that said Letters Patent is hereby corrected as shown below:

Title page, item [75] change inventor's name "Dennis F. Deshamais" to --Dennis F. Desharnais--.

Signed and Sealed this

Twenty-first Day of September, 2010

David J. Kappos
*Director of the United States Patent and Trademark Office*